B. M. BERNISEN.
SCREW DRIVER.
APPLICATION FILED OCT. 15, 1918.
1,311,147. Patented July 22, 1919.
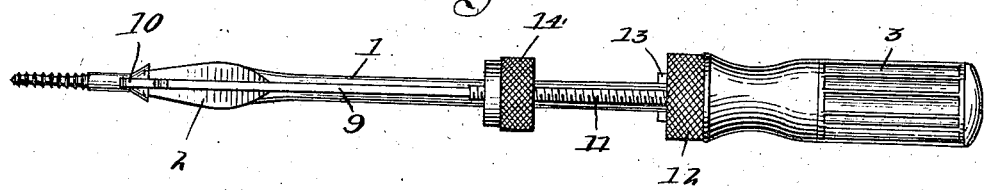
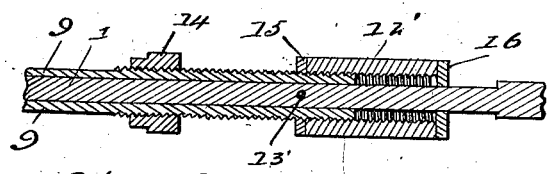
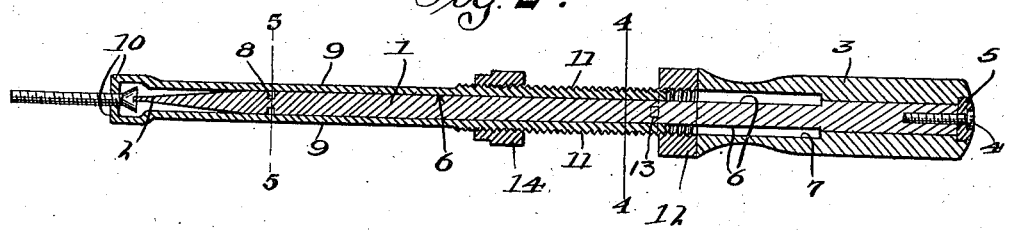
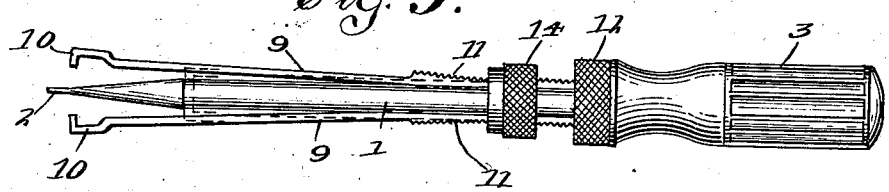
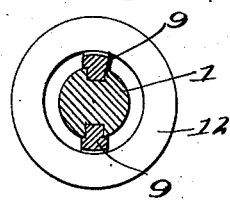 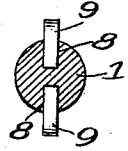
Inventor
B. M. Bernisen
By Victor J. Evans
Attorney

UNITED STATES PATENT OFFICE.

BERNT M. BERNTSEN, OF BROOKLYN, NEW YORK.

SCREW-DRIVER.

1,311,147. Specification of Letters Patent. Patented July 22, 1919.

Application filed October 15, 1918. Serial No. 258,154.

*To all whom it may concern:*

Be it known that I, BERNT M. BERNTSEN, a citizen of the United States of America, residing at Brooklyn, in the county of Kings and State of New York, have invented new and useful Improvements in Screw-Drivers, of which the following is a specification.

This invention relates to new and useful improvements in screw drivers, and the principal object of the invention is to provide means for holding a screw with the end of the screw driver engaging the slot in the head thereof.

Another object of the invention is to provide means whereby the holding means may be adjusted to suit screws of different sizes.

A further object of the invention is to provide means for moving the holding means into inoperative position when desired.

With the above and other objects in view the improvement resides in the construction, combination and arrangement of parts set forth in the following specification and falling within the scope of the appended claims.

In the drawing:

Figure 1 is a front view of a screw driver supplied with my invention,

Fig. 2 is a longitudinal section,

Fig. 3 is an edge view with the screw holding means in inoperative position,

Fig. 4 is a section on the line 4—4 of Fig. 2,

Fig. 5 is a section on the line 5—5 of Fig. 2.

Fig. 6 is a sectional view of a modification.

In these views, 1 indicates the shank of the screw driver provided with the usual flattened end 2 for engaging the screw head and 3 indicates a handle which is secured to the shank by the screw 4 and washer 5.

The shank 1 is provided with a pair of diametrically arranged slots 6 extending longitudinally thereof. These slots stand well into the handle engaged part of the shank and the handle is also slotted, as at 7, so that the slots 7 register with the ends of the slots 6. The other ends of the slots 6 communicate with holes 8 formed in the shank adjacent the flattened end thereof.

9 indicates a pair of spring strips having jaws 10 formed at their outer ends and provided with threaded portions 11 at their other ends. These strips are located in the slots 6 and are slidably arranged therein. 12 indicates a nut engaging with the screw threaded portions of the strips and held against the end of the handle by means of a pin 13. The nut is roughened exteriorly so as to provide a finger grip. When the nut is rotated the strips will be moved longitudinally in the slots, and their ends passing inwardly into the openings formed by the ends of the slots 6 and the slots 7 in the handle, when the nut is turned to force the strips in this direction. When the nut is turned in the opposite direction the strips will move outwardly until the jaws pass beyond the end of the screw driver so that they will be in a position to seize the head of a screw when brought together. This is done by means of a nut 14 located on the shank and having its screw threaded bore engaging with the screw threaded part of the strips. It will thus be seen that when the nut 14 is moved toward the end of the screw driver the jaws will be forced together to grip the head of the screw. When moved in the opposite direction the spring strips will spring apart into the position shown in Fig. 3 and by turning the nut 12 the strips may be moved inwardly to take the jaws above the end of the screw driver so that said jaws will not interfere with the action of the screw driver in pressing home the screw.

When the holding device is not to be used the nut 12 is turned until the jaws come opposite the holes 8. Then by turning the nut 14 the strips will be pressed into the grooves with the ends of the jaws engaging the holes, as shown in dotted lines in Fig. 3.

In the modification shown in Fig. 6 the nut 12' is made of considerable length so as to receive the spring strips 9 when said strips are in inoperative position so that the ends of the strips will remain in said nut throughout the movement of the strips. By this construction it is not necessary to provide slots in the handle and any type of handle may be used with this device. I place washers 15 and 16 at the ends of the nut 12' with the pin 13' passing through the washer 15.

From the foregoing description taken in connection with the accompanying drawing, the simplicity and advantages of the improvement will, it is thought, be perfectly apparent to those skilled in the art to which such invention appertains without further detailed description.

Having thus described the invention what I claim is:

A screw driver having a pair of longitudinally-extending slots in its shank and a pair of oppositely arranged holes in said shank, a pair of spring strips in said slots, jaws on the ends of said strips and screw-threaded portions on the other ends of the strips, a nut engaging said portions for moving the jaws longitudinally, and a second nut engaging the said portions for closing the jaws on the screw when the jaws are in operative position and for forcing the jaws into the holes when the jaws are in inoperative position.

In testimony whereof I have affixed my signature.

BERNT M. BERNTSEN.